United States Patent [19]
David

[11] Patent Number: 5,467,531
[45] Date of Patent: Nov. 21, 1995

[54] TREE STAND RANGEFINDER AND METHOD OF USING THE SAME

[76] Inventor: John M. David, 2059 Huntington Ave., #311, Alexandria, Va. 22303

[21] Appl. No.: 277,577

[22] Filed: Jul. 20, 1994

[51] Int. Cl.⁶ ............................. G01C 3/12; G01C 3/10
[52] U.S. Cl. ................... 33/284; 33/283; 33/277; 356/20
[58] Field of Search ............. 33/284, 276, 277, 33/278, 280, 283, 283; 356/20, 21, 3, 11

[56] References Cited

U.S. PATENT DOCUMENTS

| | | | |
|---|---|---|---|
| 1,640,425 | 8/1927 | Percival | 356/20 |
| 2,201,230 | 5/1940 | Hardie | 356/20 |
| 2,279,321 | 4/1942 | Janssen | 356/20 |
| 2,606,367 | 8/1952 | Baumer | 33/283 |
| 4,120,096 | 10/1978 | Keller | 33/283 |
| 4,974,328 | 12/1990 | Lowry | 33/265 |

Primary Examiner—Christopher W. Fulton
Attorney, Agent, or Firm—Shlesinger, Arkwright & Garvey

[57] ABSTRACT

A hand held device adapted to be used by an archer situated in an elevated position to aid in the determination of the approximate ground distance to a stationary or moving target in a simple and efficient manner in order that he might thereby increase his chances of hitting the target.

18 Claims, 4 Drawing Sheets

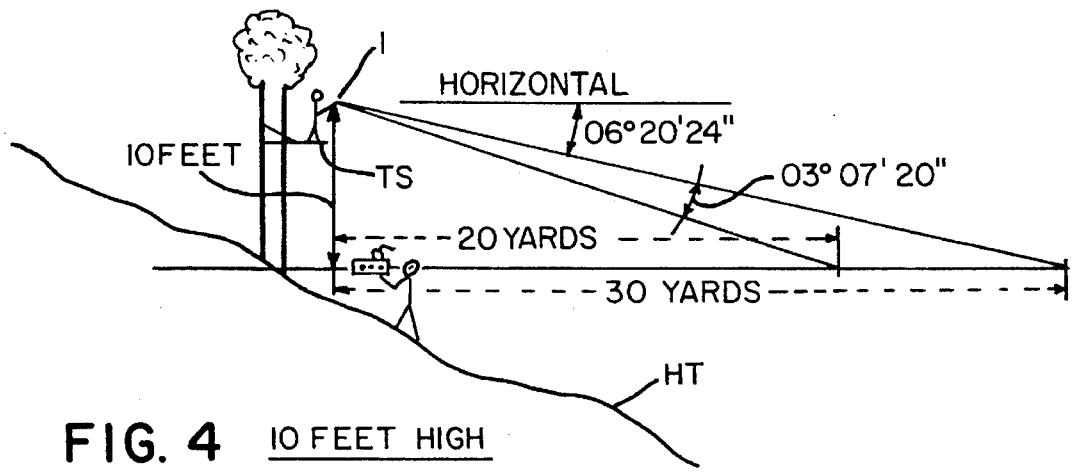
FIG. 4  10 FEET HIGH
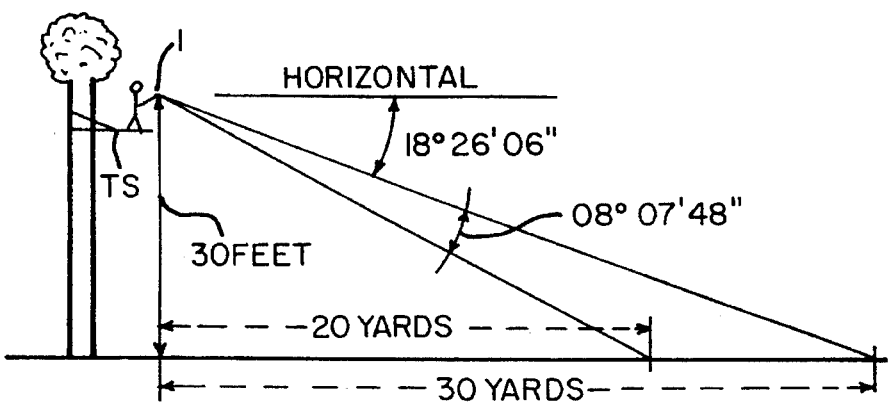
FIG. 5  30 FEET HIGH
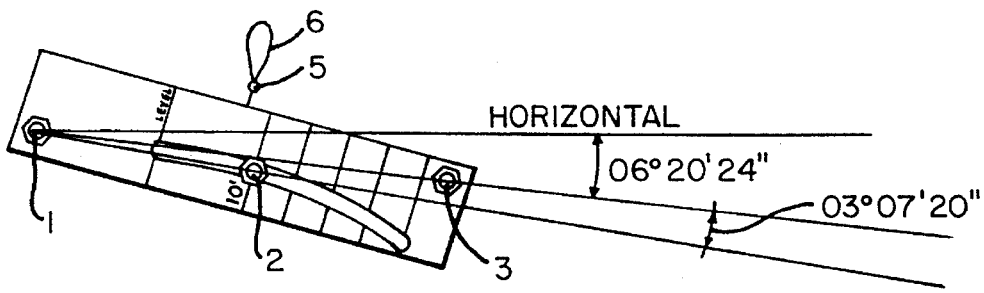
FIG. 6  10 FEET HIGH

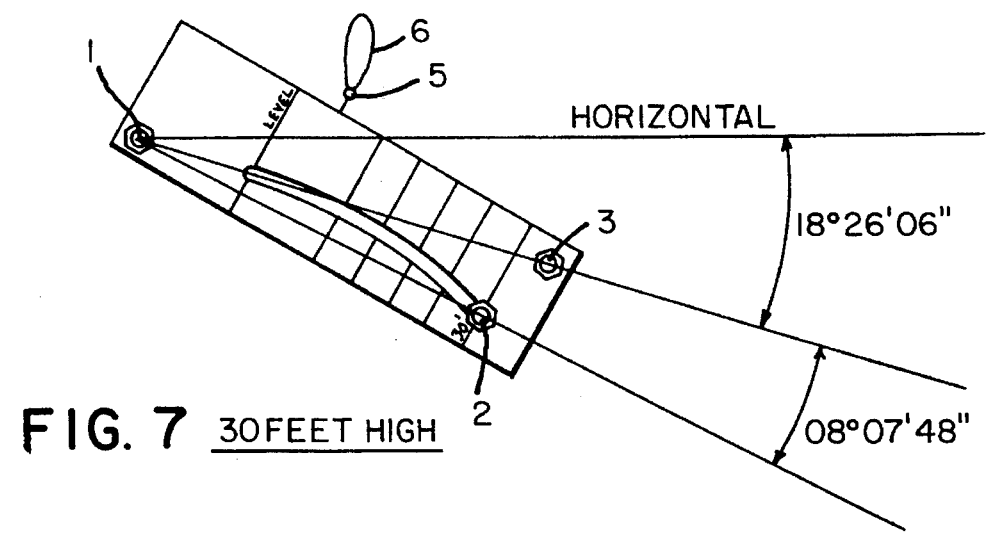
FIG. 7  30 FEET HIGH
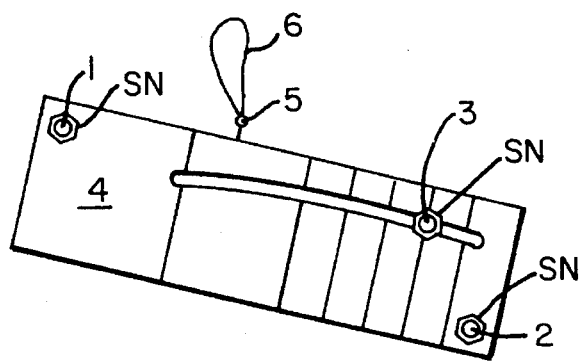
FIG. 8
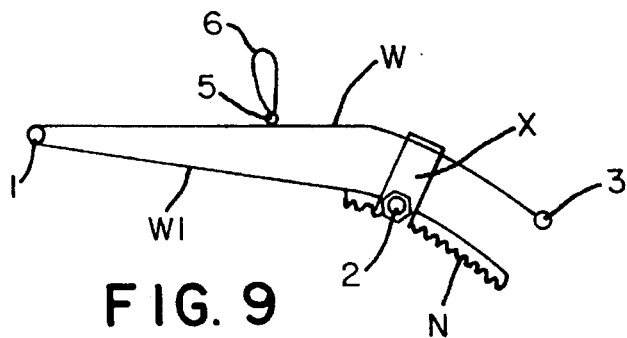
FIG. 9
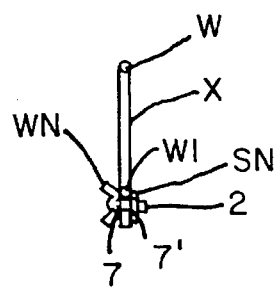
FIG. 10

TREE STAND RANGEFINDER AND METHOD OF USING THE SAME

BACKGROUND OF THE INVENTION

Archery has become increasingly popular over the past few years as evidenced by various tournaments and competitions where archers shoot at targets either in an indoor or outdoor environment in order to determine their level of skill. Additionally, game hunting with bows and arrows is on the rise and, usually, the archer is in an elevated position in a tree stand where he can survey the ground area around him. As the hunter has few opportunities to shoot at game, it is important that he determine the distance to the game in a quick and efficient manner. This distance determination is important when a compound bow is being used as this type of bow is equipped with a string peep sight and sight pins which have been pre-set at known yardages, such as 20, 30 etc. yards in order for the archer to easily determine the distance to the game and thereby assist him in the aiming and shooting of the arrow. Therefore, any assistance that can be provided to determine which sight pin should be selected would increase his chance of success.

Heretofore, these distances were determined by the hunter in various ways. He could, at some point beforehand, pace off the radial distances from the tree in which the stand is located and then use landmarks or place markers to establish/designate distances therefrom. He could also rely on commercially available optical rangefinders, which are both cumbersome and costly, or he could just guess at the distance.

The present invention is directed to a simple hand held device which can be suspended from the hunter's hand, and by eyeing fixed and adjustable sight pins he can readily determine the distance to the target and select the proper bow sight pin accordingly.

SUMMARY OF THE INVENTION

In the present invention the drawbacks of the prior practices are overcome by providing a simple hand held device which is lightweight, compact and inexpensive, and includes fixed sight pins and an adjustable pin which is positioned in a calibrated slot indicative of the hunter's distance above the ground. Once the adjustable pin is set the device can be eyed to determine ground distances and the proper bow sight pin selected in accordance therewith.

DESCRIPTION OF THE DRAWINGS

FIGS. 4 and 5 show several trigonometric layouts indicating distances determined by the hunter's elevated position;

FIGS. 6 and 7 show closeups of the device angularly disposed to correspond to FIGS. 4 and 5, respectively.

FIG. 8 is a side elevational view of a second embodiment of the invention;

FIG. 9 is a schematic illustration of a third embodiment of the invention;

FIG. 10 is a front elevational view of the device shown in FIG. 9;

DETAILED DESCRIPTION

Figure 1:
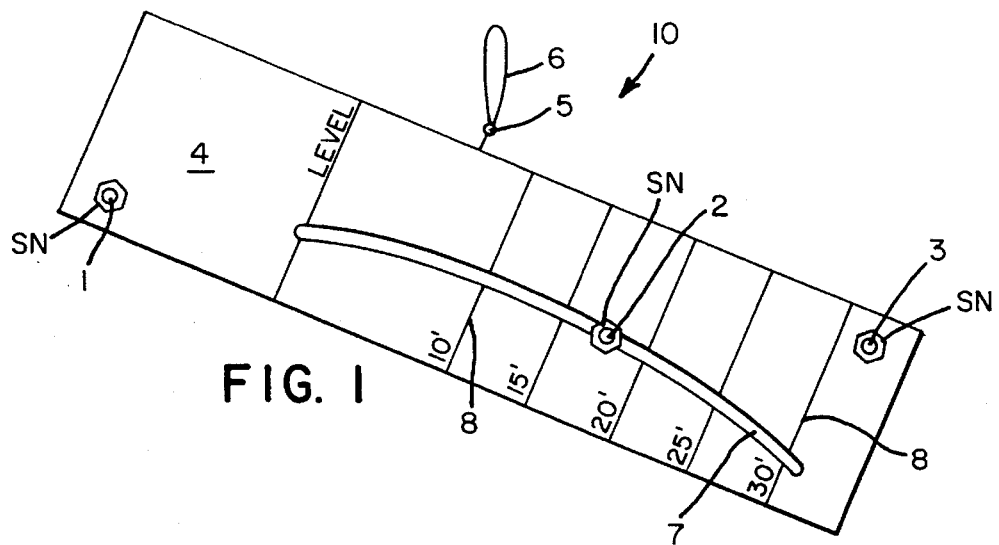
FIG. 1 is a top view of the device of the present invention.
Figure 2:
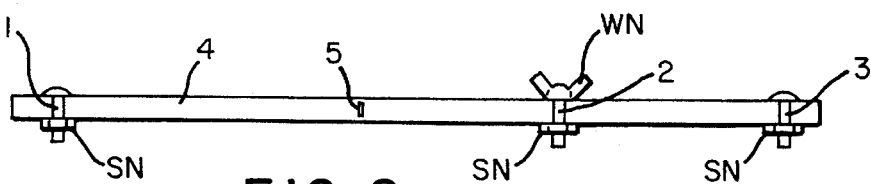
FIG. 2 is a side view thereof.
Figure 3:
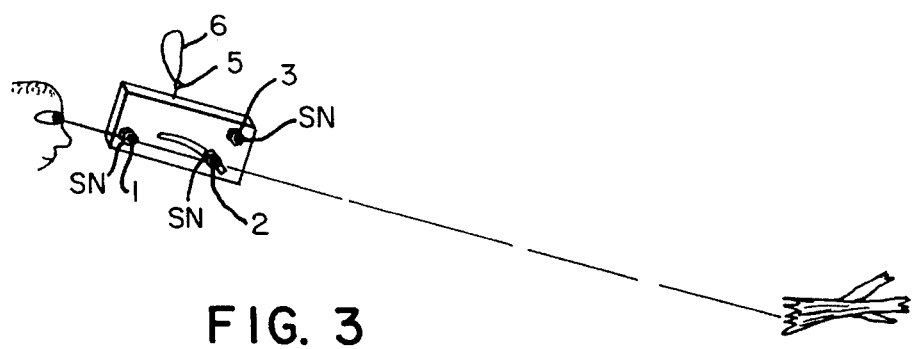
FIG. 3 is an angled view showing the manner in which the same is positioned with respect to the user's eyes.

With reference to FIGS. 1, 2 and 3, the rangefinder of the present invention is designated generally as 10, and is seen to be comprised of a rectangular base member 4 of any selected length and width with fixed sight pins 1 and 3 diagonally opposing one another. Additionally a generally medially disposed gently curving slot 7 is formed in the base 4 and has a slidably adjustable pin 2 disposed therein. The slot 7 is provided with a plurality of indicia lines incrementally increasing from a 10 foot setting to 30 feet and beyond, for example, which, in use, will designate the hunters above ground distance for reasons to be explained hereinafter. Since it is known that generally deer are shot within a 20 to 30 yard range of the archer, which corresponds to the 20 and 30 yard pins of the bow, the rangefinder was designed with these parameters in mind, although it is to be understood that the rangefinder can be designed to determine other distances.

With continuing reference to these Figures, the pins 1, 2 and 3 are comprised of screws and nuts SN with the nut of adjustable pin 2 being a wing nut WN to facilitate the loosening and tightening of the same along the slot 7. Alternatively, if the device is made from plastic, pins 1 and 3 can be integrally formed with the base 4 while the pin 2 can be a separate element frictionally disposed in the slot 7.

A suspension means for the base 4 is disposed on one edge thereof, and is comprised of an eye screw 5 having a loop 6 of any material threaded therethrough adapted to be slipped over the archer's finger during use.

With reference to FIG. 4, it is seen that with the archer positioned at an elevation of 10 feet the angle from the horizontal to the 30 yard marker is 60° 20' 24" while the angle to the 20 yard marker is an additional 3° 7' 20". Whereas in FIG. 5, with the archer at a 30 foot elevation, the 30 yard angle is 18° 26' 06" below horizontal and the 20 yard angle is 8° 07' 48".

It should then be apparent that the higher elevation will cause a larger angle as compared to a lower elevation, but the 20 and 30 yard distances will always remain the same.

FIGS. 6 and 7 depict the angle at which the rangefinder 10 is disposed relative to FIGS. 4 and 5 respectively and disclose the trigonometry involved in calibrating slot 7.

The position and curvature of slot 7 was determined by reverse engineering the same by applying trigonometric principles. Initially, pins 1 and 3 were placed on base 4 as shown in FIG. 1 with pin 3 designating the 30 yard distance while pin 1 served as the rear sight pin therefor. After calculating the necessary angles at a given height (30 feet—FIG. 5 for example) from the horizontal to the 30 yard pin, and the angle between the 30 and 20 yard pins mentioned above, a weight equivalent to pin 2 was moved across the base 4 (which is suspended from the archer's finger) until the base is tilted to the proper angle from the horizontal to the 30 yard pin previously calculated at 18° 26' 06". With base 4 at this proper attitude, pin 2, which designates the 20 yard distance, is then positioned to the point where the angle (8° 07' 48") between the 30 and 20 yard pins is achieved. This point is then marked on base 4. The procedure is repeated for several heights of 5 foot increments in this case and a curve is delineated. The slot 7 is then formed by cutting a path through the marks.

The adjustable pin 2 is then disposed in the slot and will be moved accordingly therein depending upon the archer's height in the tree. In use, the pin 2 will always designate the 20 yard distance when the same is sight aligned by the user with pin 1 to designate the 20 yard ground distance, while the sight alignment of pins 1 and 3 will designate the 30 yard distance. As seen in FIGS. 4 and 5, the 20, 30 yard distances will always be the same notwithstanding the archer's height in the tree as the rangefinder will tilt accordingly due to the weight of pin 2.

Additionally, and as seen in FIG. 1, the slot 7 is extended to terminate in a marking at the end thereof marked "level" to designate a reading when the user's elevated position is located on a hilly terrain such as shown at HT in FIG. 4. In this situation, the archer moves the 20 yard pin 2 to the level setting and, by sighting along all three sight pins 1, 2, 3, which will be aligned by design, he positions himself down the hill so that his eye is on a level with the base of the tree. He then scans the device left and right to find a level plane passing through the base of the tree. While doing this, he chooses several landmarks at various distances not known to him which are located in the level plane and, when he climbs into the tree, the rangefinder is sighted on this imaginary level plane. By using the rangefinder as described hereinabove, the exact ground distances can be quickly and easily established.

To use the device it is imperative that the hunter's height above ground be known and this is readily determined by placing distance knots or tags on the rope used by him to haul his equipment up to the stand. By tensioning the rope, he will know the distance to the base of the tree stand TS, FIGS. 4,5, and by adding his height he will easily determine the total distance above ground. He then slides the adjustable pin 2 in the slot 7 to the indicia line indicating this height, for example, if he is 10 feet above ground level, adjustable pin 2 will be set at the 10 foot marking. Loop 6 is then placed over the hunter's index finger and the device is suspended therefrom, and can be steadied with gentle pressure with the remaining fingers of his hand. The device will dangle to an angular position and the archer then eyes fixed sight pins 1 and 3 which will give him a 30 yard reading and then by aligning and eyeing pins 1 and 2 he will determine the 20 yard reading. While doing this, the archer selects a landmark for the 20 and 30 yard distances for further reference.

The archer then repeats the above process in several directions around the tree to determine the 20 and 30 yard ground distances therearound.

If the rangefinder is to be mass produced, and the recalibrating of the slot 7 is to be avoided, each individual part should be substantially identical and the relative position of all parts cannot be changed. The base should be of consistent weight and density.

Also, while the base member is disclosed as being rectangular, the same can take any shape and the slot formation will be determined in the same fashion as described hereinabove.

It is considered to be within the scope of the present invention to have alternative designs for the present rangefinder and several embodiments are seen in FIGS. 8–12 inclusive.

In the FIG. 8 embodiment, the 30 yard sight pin 3 moves along slot 7 in the same fashion as adjustable 20 yard pin 2 in the FIG. 1 embodiment and is used to designate the archer's height above ground.

In the FIG. 9 embodiment, the base 4 is designated by a pair of upper and lower wires W,W1 joined at its ends by sight pin 1 with 30 yard pin 3 being fixed to the end of the upper wire W. The bottom wire W1 is shaped to delineate the curve of slot 7 of the preferred embodiment with indicia means placed thereon in the form of notches N or by otherwise marking the same thereon with print, paint, etc. Adjustable pin 2 is disposed on a slidable member X which is then moved to the user's above-ground height as in the FIG. 1 embodiment.

As seen in the end view of FIG. 10, the slidable member X is seen to be of U-shaped configuration with the U portion thereof straddling the upper wire W. Aligned openings $7,7^1$ are formed in the lower part of each of the legs and receive the 20 yard pin 2 therein thereby trapping the lower wire W therebetween.

Figure 11:
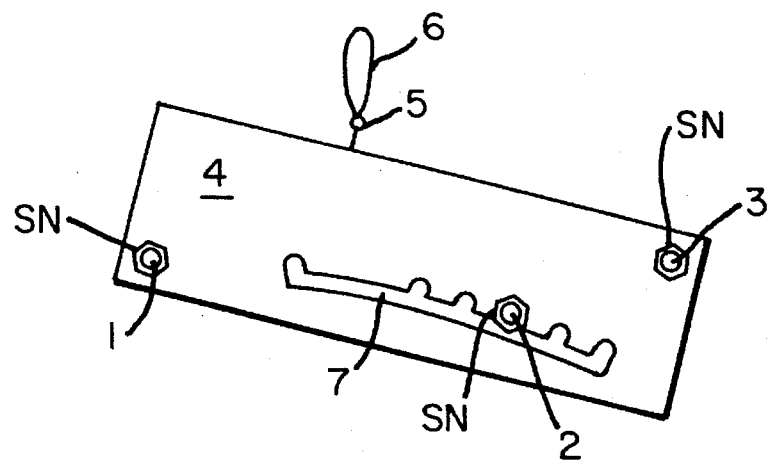
FIG. 11 is a side elevational view of a fourth embodiment of the invention.

The FIG. 11 embodiment is similar to that of FIG. 1, differing in that slot 7 is provided with a plurality of notches with each notch designating a different height, as in the FIG. 1 embodiment, to receive pin 2 therein.

Figure 12:
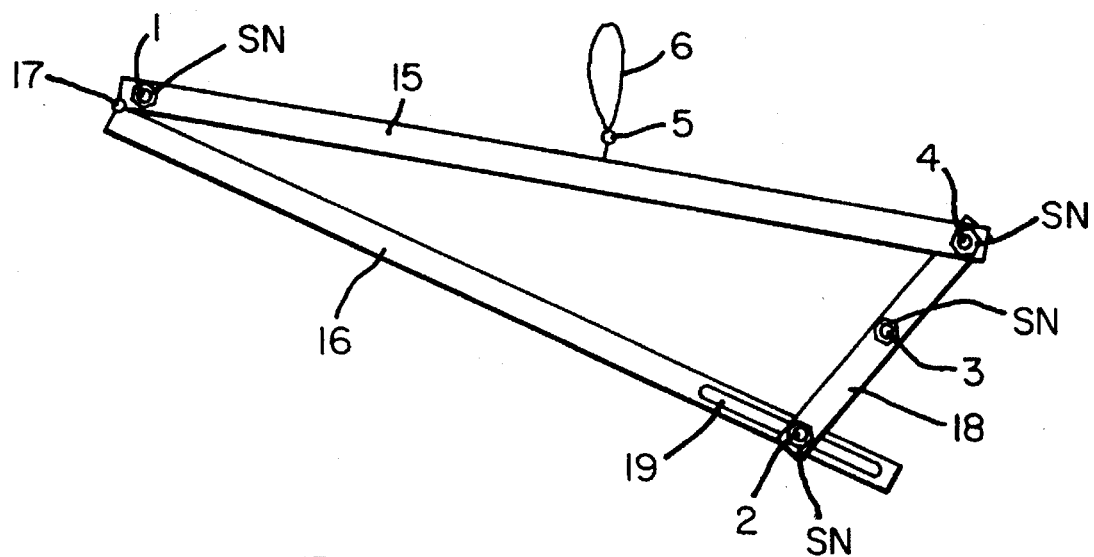
FIG. 12 is a side elevational view of a fifth embodiment of the invention.

In the FIG. 12 embodiment, the base member 4 takes the form of a pair of spaced members 15,16 pivotally joined at one end 17 supporting rear sight pin 1 with the free ends joined by a connecting arm 18. The arm 18 has pins 2, 3 and 4 disposed thereon with 20 yard pin 2 cooperating with the slot 19 in arm 16, as in the FIG. 1 embodiment, as it pivots about pin 4. Arm 18 and the attached pins cause the base to tilt in the same manner as previously described but, with the pins being commonly mounted on arm 18, three different ground differences can be determined when aligned with sight pin 1.

I claim:

1. A distance measuring device including a base member, means connected to said base member for suspending the same in a vertical position, a pair of spaced opposed pins disposed on said base member, with one of said pins indicating a ground distance to be determined and the other being a sight pin, support means disposed on said base member between said pins, indicia markings spaced along said support means indicating differing heights above ground level, and an adjustable pin means mounted for movement with respect to said support means and to said markings to designate an above-ground height whereby said sight pin sequentially cooperates with said one pin and said adjustable pin when said base member is held in suspension to determine a maximum distance and a second distance therewithin.

2. The distance measuring device of claim 1 wherein said support means is a slot with said adjustable pin means disposed for movement therein.

3. The distance measuring device of claim 2 wherein the configuration of the slot is determined by trigonometric calibrations to reflect said maximum distance and said second distance notwithstanding the position of said adjustable pin means in said slot.

4. The distance measuring device of claim 3 wherein said base member is of rectangular configuration and said pair of spaced pins, and said adjustable pin means are each a screw and nut.

5. The distance measuring device of claim 2 wherein said spaced indicia markings are notches disposed along said support means.

6. The distance measuring device of claim 1 wherein said base member is a pair of wires joined at one end and supporting said sight pin with one of said wires being said support means, a member slidably disposed on and spanning said wires, said adjustable pin being disposed on said slidable member, and said ground distance pin being fixed to the end of one of said wires.

7. The distance measuring device of claim 6 wherein the slidable member is of U-shaped configuration with the base thereof straddling one of said wires and having aligned openings provided in each of the lower leg portions, and said adjustable pin being disposed in said openings to capture said other wire therebetween.

8. The distance measuring device of claim 2 wherein the base member is comprised of a pair of spaced members pivotally joined at one end and supporting said sight pin, an arm pivotally connected to one of the free ends of one of said members and supporting the adjustable pin at the other end thereof, said slot being disposed in the other of said members with the adjustable pin slidably disposed therein, and a plurality of ground distance measuring pins mounted on said arm along the length thereof.

9. A self-contained hand-held device for measuring distance from an above-ground position, comprising:
 a) a support member;
 b) first and second projection members on said support member for measuring a preselected distance;
 c) said first projection member including a sight pin;
 d) means associated with said second projection member for indicating an above-ground height; and
 e) means for suspending the device freely in a vertical plane;
 f) whereby when the device suspends freely in a vertical plane, said first and second projection members cooperate spatially to point a location corresponding to said preselected distance.

10. The distance measuring device of claim 9, wherein:
 a) said sight pin is fixedly mounted on said support member.

11. The distance measuring device of claim 9, wherein:
 a) said height indicating means comprises a plurality of pre-calibrated markings for indicating differing above-ground heights.

12. The distance measuring device of claim 11, wherein:
 a) said second projection member comprises a distance measuring pin adjustably mounted on said support member for selecting one of said pre-calibrated above-ground height markings.

13. The distance measuring device of claim 12, wherein:
 a) said support member includes a slot;
 b) said pre-calibrated above-ground height markings are associated with said slot; and
 c) said distance measuring pin traverses through said slot for selecting one of said above-ground height markings.

14. The distance measuring device of claim 13, wherein:
 a) said support member includes a fulcrum point;
 b) said device suspending means is mounted at said fulcrum point;
 c) the device has an angle of inclination relative to the horizontal when suspended freely in said vertical plane; and
 d) said distance measuring pin is of a weight such that when traversed through said slot the angle of inclination of the device relative to the horizontal changes so as to point a location consistent with said preselected distance.

15. The distance measuring device of claim 12, wherein:
 a) said support member included front and rear;
 b) said distance measuring pin is traversable along a line; and
 c) said line extends downwardly toward the front of said support member.

16. The distance measuring device of claim 15, wherein:
 a) said line is curved.

17. The distance measuring device of claim 9, and including:
 a) a third projection member on said support member;
 b) said first and second projection members cooperate to point a location corresponding to a first preselected distance;
 c) said first and third projection members cooperate to point a location corresponding to a second preselected distance.

18. The distance measuring device of claim 17, wherein:
 a) said third projection member is fixedly mounted on said support member.

\* \* \* \* \*